July 12, 1960   A. J. VASSELLI   2,944,454
CENTERING DEVICE FOR LATHES AND THE LIKE
Filed Feb. 12, 1958   2 Sheets-Sheet 1
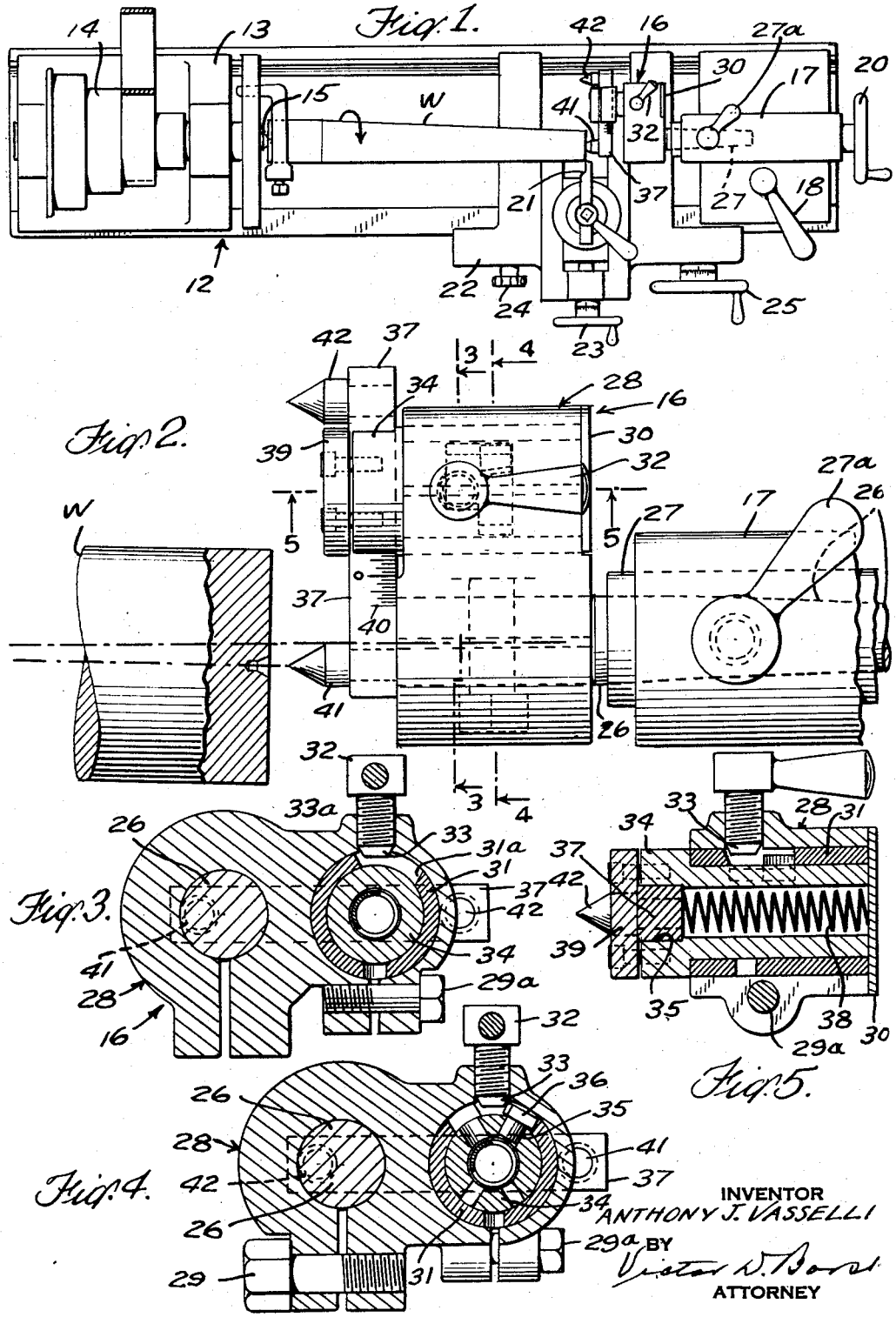
INVENTOR
ANTHONY J. VASSELLI
BY
ATTORNEY

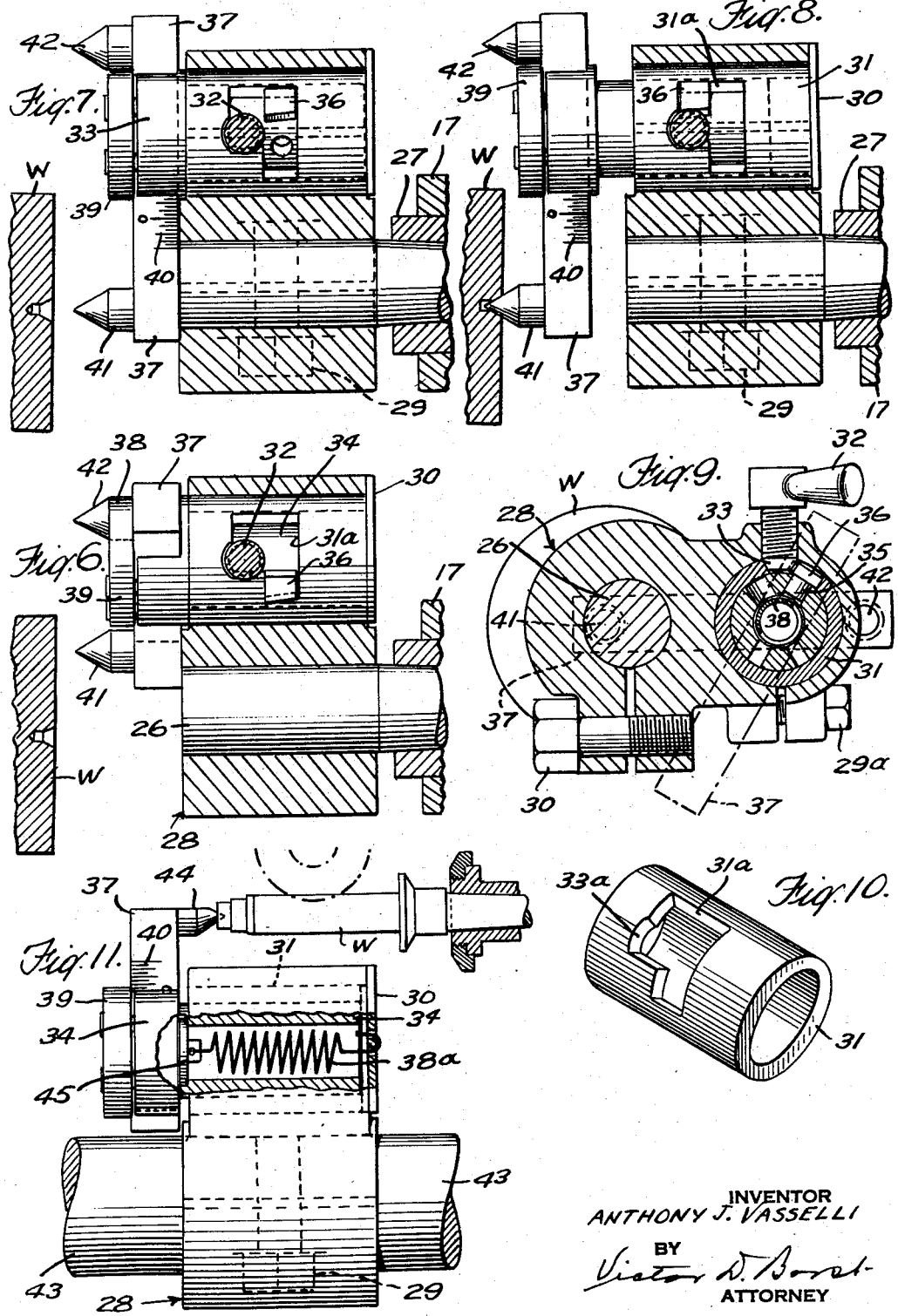

United States Patent Office 2,944,454
Patented July 12, 1960

2,944,454

CENTERING DEVICE FOR LATHES AND THE LIKE

Anthony J. Vasselli, 1 Carter Road, West Orange, N. J.

Filed Feb. 12, 1958, Ser. No. 714,905

2 Claims. (Cl. 82—15)

This invention relates to a centering device to be employed with lathes and the like and particularly to tools which afford to operators of lathes and similar machines the ability to cut accurate cylinders of the desired diameter and tapered work pieces.

The device which is the subject of this invention is peculiarly adapted for use in connection with conventional lathes, grinders, millers and similar machines. Generally, the tool provides an adjustable work center for the tail stock of such machines. A novel feature of the tool is that it provides means for positioning the center in two planes thus enabling the formation of precise cylinders and tapers and providing an expedient to compensate for a misalignment of the centers due to an inherent misalignment in the machine which is sometimes present by reason of wear or a misuse resulting in an unusual stress on the head and tail stocks. Secondly, provision is made for allowing the placement of the tail stock center on the work end under spring pressure so that the center can be locked in position while it is in pressure contact with the work so as to prevent wobbling or run out of the work on the tail stock center during operation. By proper spring selection, it is possible to predetermine the desired rotative pressure exerted by the work against the center.

One of the objects of the invention is to provide a device to be used in connection with lathes and the like which will permit accurate cutting of cylindrical and tapered work pieces.

Another object of the invention is to provide a device for lathes and the like which provides center adjusting means for assuring precise alignment between head and tail stock centers.

Another object of the invention is to provide a centering device for lathes and the like which makes available to the machine operator a pair of tail stock centers and additionally provides quick and ready means for switching from one center to the other center.

Other objects and advantages of the invention will be appreciated on reading the following specification in conjunction with the accompanying drawings, in which Fig. 1 is a plan view of a lathe assembly and the lathe device attached to its tail stock, Fig. 2 is an enlarged plan view showing the lathe device and a portion of the tail stock, Fig. 3 is a section taken on line 3—3 of Fig. 2, Fig. 4 is a section taken on line 4—4 of Fig. 2, Fig. 5 is a section taken on line 5—5 of Fig. 2, Fig. 6, Fig. 7 and Fig. 8 are sections in plane showing successive positions which the center bar and its carrier assume in the process of placing the tail stock center in work holding position, Fig. 9 is an end view in section similar to Fig. 4 showing the center holding carrier in locked position, the broken lines indicating the two extreme positions of the center bar, Fig. 10 is a detail of the sleeve employed to support the center bar carrier, Fig. 11 is a modification showing the device associated with a gear cutting machine.

Referring to the drawings, there is provided a conventional lathe 12 having a head stock 13, a multiple speed pulley assembly 14 for driving a head center 15 which holds one end of work piece W, the other end of the work piece being supported by lathe device 16 which in turn is carried by the tail stock 17 of the lathe. The tail stock is releasably clamped to the ways by clamping member 18 and is positioned thereon in the usual manner, the device being longitudinally adjustable by means of hand wheel 20. The cutting tool 21 conventionally supported on the carriage 22 is adapted to be transversely disposed relative to the work piece by means of end wheel 23. The carriage may be longitudinally fed by power on adjustment of knob 24 or, optionally, the carriage may be caused to travel by means of hand wheel 25.

The device 16 has a lower bore which receives the cylindrical end of tail stock bar 26, the other end of which is tapered and received in the Morse tapered opening of the tail stock spindle 27, being clamped therein by member 27a. The housing 28 for the holder is split in the region of the lower bore and a clamping screw 29 is received in the bifurcated sections of the casting which is adapted to lock the tool on the tail stock bar 26. Additionally, the housing 28 is provided with an upper bore which is backed by a plate 30 and receives a cylindrical sleeve 31 having an irregular opening 31a formed therein as shown in Fig. 10. The housing 28 is similarly split proximate the upper bore and a bolt 29a through the split sections serves to lock the sleeve 31 to the housing. A clamp 32 is disposed in a threaded hole in the housing 28 and has a tapered end 33 which is received in the region of the opening 31a wherein there is cut or formed an arcuate wall section 33a which provides a clearance for the clamp 32 when its shank is received in the opening 31a of the sleeve 31. A center bar carrier 34 is carried within the sleeve 31 having an aperture cut in its cylindrical wall in which there is disposed a shank 35 having a flattened head 36 the forward end of which is wider than its opposite side. As shown in Fig. 6, the flattened head 36 of the shank is received in the right hand corner of the irregular opening 31a being shouldered therein so as to prevent effectively any axial movement of the center bar carrier 34 relative to the cylindrical sleeve 31. However, as shown in Fig. 7 the carrier 34 is adapted to be rotated relative to the sleeve allowing the flattened head of the shank to escape both the shouldered portion of the opening 29 and the clamp 32 thus permitting the carrier 34 to be moved axially forward to a position where the flattened head of the shank engages the tapered end of the clamp 32. The clamp contacting edge of the flattened head is biased to complement the taper of the bottom end of the clamp and extends diagonally from the forward to the rear ends of the head and hence is adapted to positively lock the carrier 34 to the sleeve 31 on tightening of the clamp 32. The carrier 34 is bored and the forward end of the carrier extends beyond the housing 28 and the sleeve 31 being provided with a rectangular groove in which there is disposed a center bar 37. A compression spring 38 is disposed in the hollow center of the carrier extending between the plate 30 and the center bar 37 thus giving the carrier and bar a forward bias. An annular plate 39 is bolted to the forward end of the carrier 34 serving to clamp the center bar in position while allowing it to slide within the rectangular groove in the carrier when the plate is loosened. The center bar has a scale 40 the zero point of which normally indicates precise alignment between the work supporting centers of the head stock and tail stock as required for cutting cylinders. To the forward side of the center bar is attached a center 41 and a center 42 disposed at opposite ends thereof. Due to the fact that the plate 39 is easily removed from the carrier 34, the reversal of the center bar for the purpose of bringing a new center into operative position is facilitated. By virtue of the provision for permitting quick changeover from one center to the other the operator is encouraged to examine the center before and during the operation of the machine in order to determine that it is in perfect condition.

When the center bar is positioned off the zero point on the scale 40, the device is adapted to cut a taper in the work piece, the extent of which depends on the degree of center bar displacement from the common center of the head and tail stocks as measured on the scale 40. It is thus seen that the device 16 permits the lathe to cut a precisely defined taper in the work. An accurate alignment between the axial centers of the head stock and tail stock of the lathe is required to form true cylinders and to that end the tool provides means for adjusting the center 41, for example, in two planes so as to effect this desired alignment when the head stock and tail stock are slightly misaligned. This adjustment is afforded the operator by virtue of the adjustability of the center bar in the forward groove of the carrier 34 and the rotative mounting of the sleeve 31 in the housing 28, the latter adjustment being possible on release of the clamping screw 29a.

With a slight modification in structure, the centering device 16 may be applied to a gear cutting machine. As shown in Fig. 11, the device is releasably clamped to a center support bar 43. The plate 30 is disposed on the right side of the tool and the center bar 37 having a single center 44 is slidably supported on the left side of the device. A tension spring 38a extends between the plate 30 and a stud 45 which is arranged to turn free in the carrier 34. The carrier 34 is oppositely biased with respect to the sleeve 31 compared to its bias in the device above described and the sleeve 31 is reversed so as to enable the shouldered portion of its opening to hold the center bar in open position until it is released so that one of its centers can come into engagement with the work.

Various modifications in the embodiments may be effected by persons skilled in the art without departing from the scope and principle of the invention as defined in the following claims.

What is claimed is:

1. A centering device comprising a housing, first and second parallel bores in said housing a bar attachment member secured in said first bore, a sleeve mounted in said second bore, an irregular opening formed in said sleeve, an axially and rotatably slidable center bar carrier disposed in said sleeve, said center bar carrier being hollow and having a greater longitudinal length than said housing and sleeve, a flattened head secured to said carrier and extending into the irregular opening in said sleeve, said sleeve having a head retaining, shoulder portion formed in the wall of said irregular opening at one end thereof, a clamp extending through said housing and into the irregular opening of said sleeve at the other end of said opening and being engageable with said flattened head when said carrier is disposed axially in its forward position, a center bar mounted in the forward end of said carrier, a backing plate secured to said housing at the rear end of said second bore and a forward biasing spring disposed within said hollow carrier and extending between said backing plate and said center bar.

2. A centering device comprising a housing, first and second parallel bores in said housing a bar attachment member secured in said first bore, a sleeve mounted in said second bore, an irregular opening formed in said sleeve, an axially and rotatably slidable center bar carrier disposed in said sleeve, said center bar carrier being hollow and having a greater longitudinal length than said housing and sleeve, said carrier being provided with an aperture which is disposed in communication with said irregular opening in said sleeve, a shank disposed in the aperture of said carrier, a flattened head portion extending radially from said shank into the irregular opening of said sleeve, said sleeve having a shank retaining, shoulder portion formed in the wall of said irregular opening at one end thereof, a clamp extending through said housing and into the irregular opening of said sleeve at the other end of said opening and being engageable with the flattened head of said shank when said carrier is disposed axially in its forward position, a center bar mounted in the forward end of said carrier, a backing plate secured to said housing at the rear end of said second bore, and a forward biasing spring disposed within said hollow carrier and extending between said backing plate and said center bar.

References Cited in the file of this patent

UNITED STATES PATENTS

| | | |
|---|---|---|
| 1,226,825 | Stewart | May 22, 1917 |
| 1,391,034 | Williams | Sept. 20, 1921 |
| 2,390,627 | Truba et al. | Dec. 11, 1945 |
| 2,564,256 | Henderhan | Aug. 14, 1951 |
| 2,724,302 | Poorman | Nov. 22, 1955 |
| 2,800,046 | Kluck | July 23, 1957 |